Feb. 9, 1932. J. S. McCLENAHAN 1,844,329
ELECTROLYTIC APPARATUS
Filed Dec. 24, 1927
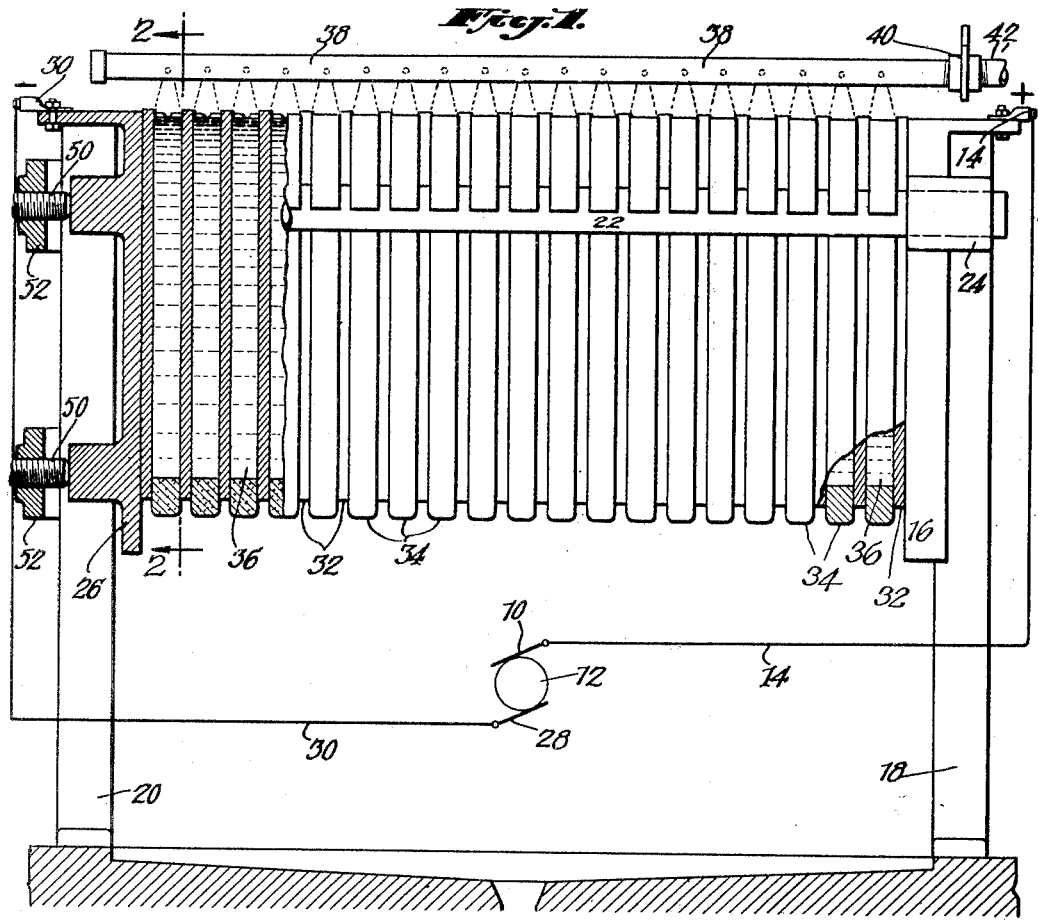
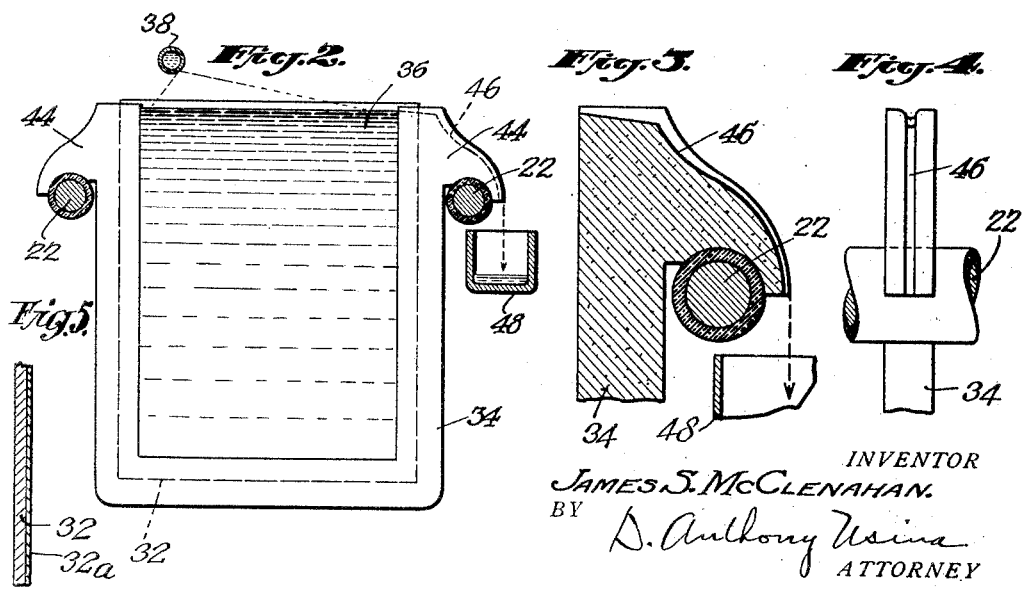
INVENTOR
JAMES S. McCLENAHAN.
BY D. Anthony Usina
ATTORNEY Patented Feb. 9, 1932

1,844,329

UNITED STATES PATENT OFFICE

JAMES S. McCLENAHAN, OF NEW YORK, N. Y.

ELECTROLYTIC APPARATUS

Application filed December 24, 1927. Serial No. 242,325.

My invention relates to an electrolytic apparatus comprising a multiplicity of cells, each having an insoluble electrode including an anode and a cathode surface, intended for the electrolytic recovery of metals from their solution in an electrolyte. The embodiment illustrated is intended primarily for use in connection with the recovery of copper from a solution of its ores, but is of course not limited to such specific use.

Before describing my invention it may facilitate the understanding to review briefly, the manner in which this work has hitherto been accomplished. Heretofore the metal bearing electrolyte was circulated in a container for the outstanding dual purposes of regulating the solution temperature and replacing the metal constituent as it became depleted through electrolytic precipitation. The electrodes in such containers have been arranged in several manners of grouping but always so that all the anodes receive current from a common distributing bus bar, whence the current traverses the electrolyte and arrives at the cathode electrodes of opposite polarity which are similarly arranged so that all the current is collected and delivered again into a common bus bar leading to the next group or returned to the dynamo, thereby completing the electric circuit. Thus it will be seen that in the prior apparatus all the electrodes are connected in parallel and a tank acts as one electrolytic cell so that the voltage required to cause a current of the proper intensity to flow, is approximately the same between any pair of dissimilar electrodes therein and also is essentially the same as that of the entire tank itself.

Such prior arrangement requires a great number of connections, each with an appreciable voltage drop requirement when current is caused to flow from bus bar to anode bar, anode bar to insoluble anode, insoluble anode to cathode, cathode to suspension loop, suspension loop to cathode rod, cathode rod to bus bar and so returned to commence its path in the next adjacent tank.

My improved apparatus, which I have used and found to operate at a very considerable saving in power, is constructed with a conducting head plate at one end which receives direct current from the positive pole of a dynamo, and this current after passing through a number of intermediate cells, flows to a similar conducting tail plate which is connected to the negative pole or bus bar intended to go to the other similar units or return to the dynamo, thereby completing the electric circuit. Between these opposite head and tail conducting plates is a series of cells each with an insoluble electrode having an anode surface and a cathode surface which electrode may be one and the same homogenous conductor. This insoluble conductor or electrode is made of such materials as will properly and adequately serve as a means of conveying the electric current and yet be sufficiently resistant to electrolytic corrosion as to be suitable for use in the particular electrolyte employed. Some suitable materials which I prefer are sheet lead, antimonial lead alloys, ferro-silicon alloys, cupro-silicon alloys, magnetite, cobalt silicide and others, but it is not intended that a choice of the material so used in any way affects its direct use and application in this apparatus.

The multiplicity of cells above referred to are formed by non-conducting separator members which serve the dual purposes of electrically separating and insulating the insoluble electrodes from one another as well as forming a container for the circulating electrolyte. As before mentioned these separating pieces are intended to be non-conducting electrically and inert chemically and may be made of stoneware, wood, rubber, asphalt or a combination of these, or other materials equally suitable for the purpose but a choice of such materials is not intended to be made here as a patentable limitation.

One form of apparatus embodying my invention is illustrated in the accompanying drawings in which—

Fig. 1 is a vertical longitudinal section therethrough;

Fig. 2 is a typical cross-section on line 2—2 of Fig. 1;

Fig. 3 is an enlarged detail of a portion of a spacing member;

Fig. 4 is an end view of Fig. 3;

Fig. 5 illustrates an alternative form of electrode.

In the embodiment of the invention illustrated, 10 represents the positive pole of a dynamo 12 which is connected by a suitable conductor 14 to a fixed conducting head plate 16 carried by a fixed standard 18. A similar standard 20 is located at the opposite end of the apparatus and supporting bars 22 are carried in suitable bosses 24 formed on said standards. A tail plate 26 of conducting material rides on the bars 22 and is connected with the negative terminal 28 of the dynamo by a conductor 30.

Between the head plate 16 and tail plate 26 are located a multiplicity of plate-like electrodes 32 which are spaced apart by substantially U-shaped members 34 which serve to hold electrolyte 36 supplied from an overhead pipe 38 which is connected by a quick detachable joint 40 with a supply main 42.

The bars 22 are covered with insulating sheaths which serve as insulated supports for the members 34, which as shown in Figs. 2 and 3 are provided with extensions 44 having seats shaped to fit the supporting rods. The extensions 44 at one side are provided with grooves 46 to provide an overflow for the electrolyte and a launder 48 is provided to catch the overflow. The assemblage of plate-like electrodes and electrolyte holders 34 are held in assembled relationship by clamp screws 50 which are threaded through brackets 52 secured to the standard 20.

In operation, a direct current of suitable intensity flows from the positive pole 10 of the dynamo 12 by wire 14 to the head plate 16 which in turn is in contact with the first insoluble electrode 32 thus leading the current into the first compartment or cell. This electrode which in the commercial sense is called insoluble but which actually in the practice of the art may be very gradually disintegrated, passes the current into the electrolyte 36 with a characteristic evolution of gaseous components caused by a dissociation of the electrolyte. The current thus traverses the electrolyte, which is being constantly circulated and replenished from the external source 38, and enters the cathode surface of the next electrode 32 directly opposite, depositing thereon an electro-chemical equivalent of the metal being reclaimed from the solution. This cathode surface upon which the electrolytic precipitation takes place is ordinarily, although not necessarily so, the reverse side of the same individual plate which forms the insoluble anode for the next compartment or cell, and the amount of metal so plated is of course a function of the intensity of current used and the time interval through which electrolysis is conducted. When the amount of metal so plated is of a desired amount the cells are drained, the apparatus opened by turning the screws 50 thus relieving the end pressure which has held the assembly together during operation, and the reclaimed metal is easily stripped from the cathode surface.

In the event of it being required for facilitating the stripping of the deposit, the cathode surface of each electrode may be given a light coating of oil or resinous solution of a suitable nature and texture to form a cleavage plane.

Reverting again to the passage of the current after the deposition of the metal and the current received into material of the cathode-insoluble anode, it traverses the very short distance to the anode face where a reversal of polarity takes place and a repetition of the entire action of the cell just explained takes place. And so the current flows in series the entire distance of the number of cells provided which may be a hundred or more, until it finally arrives upon the last cathode surface which is held in contact with the tail plate 26 of conducting material which is provided with a conductor leading to other similar apparatus or back to the negative pole of the dynamo thus completing the electric circuit.

In the above described manner, it is clear that the path of the electric current is greatly shortened as compared with prior apparatus, and many contacts are eliminated. Permanent rigidity of the anode and cathode surfaces makes for the obtaining of a higher degree of power efficiency, inspection during the growth of the deposit is easily had, and the final results show by test a decidedly increased yield of the metal for each kilowatt of energy expended.

The electrodes 32 referred to above shown in Figs. 1 and 2 are formed of a single homogeneous plate one face of which serves as an anode and the other face of which serves as a cathode on which the metal from solution is deposited. If desired, however, instead of making the electrode of a single homogeneous plate, I may use an electrode 32 as illustrated in Fig. 5 having a thin metallic plate 32$^a$ such as sheet copper. Such a sheet can be clamped to the face of the electrode 32. In operation, the metal from solution would be deposited on this thin sheet 32$^a$ and after the required deposit is built up when the clamps are released, the deposited metal can be easily and quickly detached from the plate 32. The term "insoluble electrode" used in the claims is intended to cover either the single plate electrode 32 or the composite electrode as illustrated in Fig. 5 having a plate held in contact with the plate.

Though I have described with great particularity of detail certain specific embodiments of my invention, it is not to be understood therefrom that the invention is restricted to the particular embodiments disclosed. Various modifications in detail and in the arrangements of the parts may be made by those skilled in the art without departing from the invention as defined in the following claims.

What I claim is:—

1. In an apparatus of the character described, a dielectric member of material chemically inert to electrolyte, bi-polar electrodes arranged to receive current from electrolyte retained by said members, means for supplying electrolyte to the members, said members having grooved overflows at the top thereof and means for receiving the electrolyte overflowing from the tops of said members.

2. An apparatus for the electrolytic recovery of metal from solution comprising a multiplicity of spaced bi-polar insoluble electrodes immersed in solution and adapted to have the metal recovered from solution deposited thereon and connected with a source of electric current and so arranged that the current flows in series from one plate through the solution to the next plate and so on throughout the apparatus and dielectric containers closed at the bottom and sides and open at the top adapted to retain the solution in contact with said electrodes.

In witness whereof, I have hereunto signed my name.

JAMES S. McCLENAHAN.